Patented Dec. 13, 1949

2,490,842

UNITED STATES PATENT OFFICE 2,490,842

ANISOLE MANUFACTURE

Walter D. Smutz, Bedford, Ohio, assignor to E. I. du Pont de Nemours & Company, Wilmington, Del., a corporation of Delaware No Drawing. Application January 27, 1947, Serial No. 724,718

8 Claims. (Cl. 260—612)

This invention relates to etherification processes and more particularly to processes for producing methyl ethers of aromatic hydroxy compounds, especially anisole, in which a methyl sulfate is added to a hot aqueous solution of a salt selected from the group consisting of alkali metal and ammonium salts of aromatic ring-substituted hydroxy compounds, the rate of addition being such that the methyl sulfate does not exceed its solubility in the solution, whereby reaction occurs and a methyl ether of the aromatic ring-substituted hydroxy compound is formed, and the methyl ether is removed from the reaction mixture as fast as it is formed.

Processes for etherifying aromatic hydroxy compounds heretofore available have suffered from the disadvantage that poor yields were obtained based on the amount of etherifying agent used. Yields as high as 75% have been considered to be about all that could be expected. Dimethylsulfate is often used as an etherifying agent and the poor yields obtained have been explained on the premise that the first methyl group is readily available for reaction and is readily converted but the second group is tenaciously held and that even prolonged exposure of an etherifiable material to the action of dimethylsulfate would not suffice to increase the yield above the 75% maximum.

Now according to the present invention it has been found that yields up to almost 100% of theoretical may be achieved in processes for producing methyl ethers of aromatic hydroxy compounds by adding a methyl sulfate to a hot aqueous solution of a salt selected from the group consisting of alkali metal and ammonium salts of aromatic ring-substituted hydroxy compounds, the rate of addition being such that the methyl sulfate does not exceed its solubility in the solution, whereby reaction occurs and a methyl ether of the aromatic ring-substituted hydroxy compound is formed, and removing the methyl ether from the reaction mixture as fast as it is formed.

The invention will be particularly described with relation to processes for producing anisole, $C_6H_5OCH_3$ using dimethylsulfate as the methylating agent but it will be understood that the processes are applicable to the production of methyl ethers of other aromatic hydroxy compounds and that methyl acid sulfate may be used as the methylating agent.

By the term "aromatic hydroxy compound" is meant any compound in which there is a hydroxy group attached directly to an aromatic ring, such as phenol. The aromatic nucleus may contain a plurality of rings, as in the case of naphthol. There may be a plurality of hydroxy groups on the aromatic nucleus, as in the case of resorcinol. There may be substituent groups on the ring, as in the case of vanillin.

The methyl sulfate used according to a process of this invention may be a sulfate having a methyl group directly attached to the sulfate radical. The methyl sulfate may also contain a metal substituent on the sulfate radical, as in the case of sodium methyl sulfate or potassium methyl sulfate, it may contain an ammonium substituent as in the case of ammonium methyl sulfate, or it may contain a hydrogen substituent as in the case of methyl acid sulfate. When dimethylsulfate is the methyl sulfate used particular advantages are achieved, because problems arising from the sparing solubility of the dimethyl sulfate are overcome according to a method of this invention.

The methyl sulfate is added to an aqueous solution of a salt selected from the group consisting of alkali metal and ammonium salts of the aromatic ring-substituted hydroxy compound. Thus, the solution may, for instance, contain sodium, potassium, lithium, or ammonium phenate, in which cases the ether formed will be the methyl ether of phenol, anisole. The aqueous solution should remain hot, it being preferred to conduct the reaction at upwards of 80° C. It is particularly preferred to maintain the temperature at or above that at which the product formed is steam-distilled off as fast as it is formed. In the case of anisole, for instance, this temperature is about 106° C.

It is desirable that the aqueous solution contain a substantial concentration of the salt of the aromatic hydroxy compound. Particularly beneficial results are obtained when the concentration is above about 12% by weight of the salt and in the case of the manufacture of anisole it is especially preferred that the solution contain about 23% of sodium phenate by weight.

The rate of addition of the methyl sulfate should be such that it does not exceed its solubility in the solution. When a metal methyl sulfate or ammonium methyl sulfate is used the solubility is relatively high and the rate of addition may be relatively rapid at least until the solution becomes partially saturated with the metal sulfate formed by the reaction. A common ion effect then occurs and the rate of addition may need to be reduced. When methyl acid sulfate is used it may be desirable to have present in the reaction mixture an amount of a basic material sufficient to react with the acid sulfate radical. On the other hand, when dimethylsulfate is used the rate of addition will need to be relatively slow because dimethyl sulfate is only sparingly soluble in the reaction medium.

It is particularly preferred that the reaction mixture be violently agitated during the addition of the dimethylsulfate and that the dimethylsulfate be added to the bottom of a volume of the aqueous sodium phenate solution. The dimethylsulfate may be run in, for instance, through an addition tube extending to the bottom of the reaction tank and an agitator may be so disposed as to create an intense zone of agitation at the end of this addition tube. It will be understood that even though the solution is not saturated with respect to dimethylsulfate the undesirable condition of having undissolved dimethylsulfate may nevertheless result unless care is taken to disperse the dimethylsulfate as it enters the reaction mixture.

Under the conditions above described a reaction occurs and a methyl ether of the aromatic ring-substituted hydroxy compound is formed. The reaction of dimethylsulfate and sodium phenate, for instance, proceeds according to the following equation:

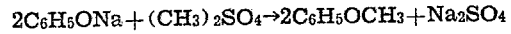

$2C_6H_5ONa + (CH_3)_2SO_4 \rightarrow 2C_6H_5OCH_3 + Na_2SO_4$

It will be noted that this equation calls for the use of both of the methyl groups on the dimethylsulfate and the processes of the present invention accomplish substantially this result. Heretofore it has been regarded as impossible to recover more than about half of the second methyl group in the product.

As fast as the methyl ether of the aromatic ring-substituted hydroxy compound is formed it should be removed from the reaction mixture. Where the conditions are right, as in the case of anisole, this may ideally be accomplished by steam distillation, that is, by carrying out the reaction at a temperature sufficiently high to effectuate steam distillation of the product. The distillate may then be condensed, separated as by gravitation into an anisole layer and an aqueous layer, and the aqueous layer returned to the reaction mixture. Preferably the portion of aqueous layer which is returned to the reaction mixture should be taken from a point proximate to the anisole-aqueous interface because any anisole entrained in the aqueous fraction is thereby recovered. It will be apparent, of course, that not all of the aqueous fraction will need to be returned, but only that portion required to maintain the volume of the reaction mixture substantially constant.

It will be observed from the above equation that sodium sulfate is a by-product of the reaction. This may be removed by allowing it to accumulate until it exceeds its solubility and crystals are formed, the crystals being withdrawn by allowing them to settle out and withdrawing them through a device such as a salt-lock. Alternatively the reaction mixture may continuously be withdrawn, passed through a screen to remove the crystals, and the clarified mixture returned to the reaction vessel. In either case the crystals may be washed, as with water, to avoid carry-out losses.

The washed crystals may be redissolved in the aqueous fraction of the steam distillate, if desired, to give a salting-out effect whereby the recovery of the aromatic ether is improved. While anisole, for instance, has a very low solubility in water the improvement effected by such a salting-out procedure is nevertheless ordinarily economically justified.

In practice all of the foregoing operation steps may advantageously be carried out continuously. In the case of anisole, for instance, the sodium phenate may be continuously formed in the reaction mixture by adding phenol and sodium hydroxide in stoichiometric proportions. A slight excess of sodium hydroxide may be used here in the event that the dimethylsulfate to be used should contain free sulfuric acid. Steam distillation of anisole, the separation of anisole and water from the distillate, the removal of sodium sulfate, and the saturation of the distillate with the sodium sulfate may all be carried out continuously with the operational advantages which such operation entails.

The nature of this invention will be better understood by reference to the following illustrative examples.

*Example 1*

To a reaction vessel there was added 67.2 parts by weight of water and 23 parts by weight of phenol and the mixture was heated with agitation to 50° C., whereupon the phenol melted and went into solution. There was then added 9.8 parts by weight of sodium hydroxide pellets and the mixture was stirred until the sodium hydroxide dissolved, whereby reaction occurred and sodium phenate was formed. This gave 100 parts by weight of a 28.4% sodium phenate solution.

This solution was heated to 112° C., which was approximately its boiling point. To the solution there was then added, simultaneously, dimethylsulfate and a sodium phenate solution containing 21% by weight of sodium phenate and .05% of sodium hydroxide. The purpose of the sodium hydroxide was to neutralize an equivalent free acidity in the dimethylsulfate. The dimethylsulfate was added through an addition tube extending to the bottom of the reaction vessel and the reaction mixture was violently agitated, with the zone of maximum agitation being at the point of delivery of the dimethylsulfate. The dimethylsulfate and additional sodium phenate solution were charged in gradually over a period of two hours. During the addition care was exercised to avoid adding dimethylsulfate at a high enough rate to exceed its solubility in the reaction mixture, that is, no undissolved dimethylsulfate was permitted to be present.

It was noted that upon addition of the dimethylsulfate and sodium phenate solution the temperature of the mother liquor dropped from 112° C. to 106° C. and there was immediately formed a cloud in a distillation column connected with the reaction vessel indicating the formation of an anisole water vapor mixture. The temperature was maintained so that the anisole steam-distilled off as fast as it was formed. The distillate was collected and allowed to separate gravitationally into 2 layers. The lighter layer was withdrawn as product. It was found to be anisole of high quality.

The rate of dimethylsulfate addition was such that it did not exceed the rate of distillation of anisole, that is, for each unit volume of dimethylsulfate added 2.3 volumes of anisole were distilled over.

It was noted that during the course of the reaction sodium sulfate was formed and eventually exceeded its solubility so that it was present in solid form in the reaction mixture.

An over-all yield of 93.6% of anisole was obtained, based on the total dimethylsulfate charged. It should be observed, however, that after half of the dimethylsulfate had been added the agitation was increased in intensity and the yield for the last half of the addition was 98.5%. It is further to be noted that after addition of the dimethylsulfate was completed steam distillation was continued until a total of 80 parts by volume of additional distillate were collected. Of this volume only 12 parts was found to be anisole, indicating that the anisole was steam distilling out practically as fast as formed.

*Example 2*

In this embodiment of the invention the methyl sulfate employed is methyl acid sulfate, $CH_3HSO_4$. The procedure of Example 1 is repeated exactly except that instead of dimethylsulfate there is added methyl acid sulfate and at the same time there is separately added an amount of sodium hydroxide stoichiometrically equivalent to the acidity of the methyl acid sulfate. In this way the heat of neutralization of the methyl acid sulfate-sodium hydroxide reaction is formed in the reaction mixture and less added heat needs to be furnished.

By this method anisole of high purity and in good yield is obtained.

*Example 3*

A continuous process for making anisole continuously on semi-works scale is described as follows:

The equipment in this embodiment of the invention comprises a cone bottom reactor of such a size that the surface vapor velocity does not exceed 20 pounds per square foot per hour evaporation rate at atmospheric pressure, the tank being about 2 feet in diameter. The tank is a closed vessel having a side outlet consisting of a 1¼" O. D. pipe 4 feet long connected with a centrifugal pump, the discharge side of which is connected through a heat exchanger to a return pipe which opens into the reactor above the liquid level in the reactor. The centrifugal pump has a capacity sufficient to produce turbulent flow throughout the outlet, heat exchange, and return lines to a degree sufficient to prevent deposition of sodium sulfate on the pipe walls within the heat exchanger. As close as possible to the point where the outlet pipe leaves the reactor are located first, an inlet for sodium hydroxide solution and second, an inlet for phenol. As close as possible to the point where this pipe delivers into the pump is located an inlet for dimethylsulfate. The turbulence within the tube is sufficient to give instantaneous mixing of sodium hydroxide, phenol and dimethylsulfate, and additional intense agitation is provided by the shearing action within the centrifugal pump. The heat exchanger has sufficient heat exchange capacity to cause vaporization of the anisole and a quantity of water sufficient to steam distill it as soon as the solution is returned to the reactor.

From the top of the reactor a gas vapor passage connects to a condenser, the product discharge passage from which connects to a gravimetric separator. At the top of this separator is a product discharge outlet and at the bottom is a water discharge outlet leading back to the reactor through an overflow box with means for maintaining a constant level in the reactor.

The cone bottom of the reactor is connected to an inclined pipe in which is located a conveyor screw adapted for advancing precipitated sodium sulfate up the incline to a point above the liquid level in the reactor tank and ultimately discharging a drained sodium sulfate crystal. Provision is made in the inclined pipe to wash the crystals with water from the above-mentioned gravimetric separator.

In carrying out the reaction in the above-described apparatus sodium hydroxide and phenol are added through their respective addition inlets in stoichiometric proportions until a predetermined volume of sodium phenate is formed in the reactor. The sodium hydroxide is added in the form of a 50% aqueous solution and sufficient water to provide turbulent flow in the reaction arm is provided. Sufficient water is added to the reactor to bring the level up to a predetermined maximum whereby a solution containing at least 23% of sodium phenate is produced. Heat is then supplied through the heat exchanger sufficient to bring the entire volume of solution up to 112° C. Addition of dimethylsulfate is started and addition of sodium hydroxide and phenol is continued, the proportions of these reactants being stoichiometrically equivalent with sufficient excess sodium hydroxide to avoid any build-up of acidity from the dimethylsulfate. The solution returning to the reactor from the heat exchanger contains anisole which at a temperature of 112° C. tends to steam distill off. This tendency is restricted, as by means of an orifice, until the solution enters the upper portion of the reactor. There it is permitted to flash distill, the anisole and water vapor passing to the condenser, thence to the gravimetric separator, and the anisole product is withdrawn and water is returned to the reactor. The flash distillation effects a drop in temperature to about 106° C. and additional heat is supplied from the heat exchanger continuously to bring the temperature up to 112° C. After the process has been in operation for a time sodium sulfate begins to crystallize out in the reactor. A portion of this sodium sulfate continuously settles in the cone bottom of the reactor and is continuously withdrawn through the inclined pipe by means of the screw conveyor. The crystals are washed as they are withdrawn by means of a countercurrent wash using water from the gravimetric separator.

It is seen that the foregoing process provides a continuous operation for making anisole. The yields are very satisfactory being in all cases upwards of 93% and under preferred conditions being 98% or better, based on the dimethylsulfate used.

*Example 4*

This example describes the application of a process of this invention to the production of veratraldehyde from vanillin.

The apparatus used in this example is similar to that of Example 3 except that the condenser and gravimetric separator are eliminated and the reactor is provided with means for removing molten veratraldehyde from a stagnant pool at the top of the liquid level.

The reaction involved consists in treating vanillin with sodium hydroxide to form sodium vanillate and methylating the sodium vanillate to veratraldehyde according to the equations:

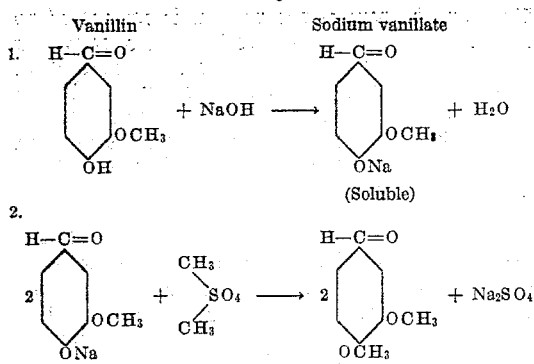

The vanillin and sodium hydroxide are first caused to react until a substantial concentration of sodium vanillate is achieved in the circulating reaction solution and the addition of dimethylsulfate is then started. Heat is supplied from the heat exchanger to bring the temperature up to about 80° C. In this case however, the product formed is veratraldehyde which is not sufficiently volatile to make steam distillation practicable. Therefore the reactor is so constructed that opportunity for gravimetric separation is provided, the veratraldehyde collecting as a molten, insoluble liquid at the top of the liquid in the reactor. From this collection point the veratraldehyde is drawn off continuously as product.

By the foregoing process veratraldehhyde is continuously produced and in good yield.

I claim:

1. In a process for producing anisole the steps comprising adding a methyl sulfate with agitation to a hot aqueous solution containing more than about 12% by weight of a phenate selected from the group consisting of alkali metal phenates and ammonium phenate at a rate such that the methyl sulfate does not exceed its solubility in the solution, whereby reaction occurs to form anisole, and removing the anisole from the reaction mixture as fast as it is formed.

2. In a process for producing anisole, the steps comprising continuously adding dimethylsulfate with agitation to an aqueous solution containing more than about 12 per cent of sodium phenate by weight at a temperature high enough to steam-distill anisole but not substantially higher, the rate of addition being such that the dimethylsulfate does not exceed its solubility in the solution, whereby reaction occurs forming anisole, as fast as anisole is formed steam-distilling it off, and recovering anisole from the material so distilled.

3. In a process for producing anisole, the steps comprising continuously adding dimethylsulfate with agitation to an aqueous solution containing more than about 12 per cent of sodium phenate by weight at a temperature high enough to steam-distill anisole but not substantially higher, the rate of addition being such that the dimethylsulfate does not exceed its solubility in the solution, whereby reaction occurs forming anisole, as fast as anisole is formed steam-distilling it off, condensing the distillate, separating it into an anisole fraction and an aqueous fraction, and withdrawing the anisole fraction as product.

4. In a process for producing anisole, the steps comprising continuously adding dimethylsulfate with violent agitation to the bottom of a volume of an aqueous solution containing more than about 12 per cent of sodium phenate by weight at a temperature high enough to steam-distill anisole but not substantially higher, the rate of addition being such that the dimethylsulfate does not exceed its solubility in the solution, whereby reaction occurs forming anisole and sodium sulfate, as fast as anisole is formed steam-distilling it off, condensing the distillate, separating it into an anisole fraction and an aqueous fraction, and withdrawing the anisole fraction as product.

5. In a process for producing anisole, the steps comprising continuously adding dimethylsulfate with violent agitation to the bottom of a volume of an aqueous solution containing about 23 per cent of sodium phenate by weight at about 106° C. under about one atmosphere absolute pressure in a reaction vessel, the rate of addition being such that the dimethylsulfate does not exceed its solubility in the solution, whereby reaction occurs forming anisole and sodium sulfate, as fast as anisole is formed steam-distilling it off, condensing the distillate, separating it into an anisole fraction and an aqueous fraction, and withdrawing the anisole fraction as product.

6. In a process for producing anisole, the steps comprising continuously adding dimethylsulfate with violent agitation to the bottom of a volume of an aqueous solution containing about 23 per cent of sodium phenate by weight at about 106° C. under about one atmosphere absolute pressure in a reaction vessel, the rate of addition being such that the dimethylsulfate does not exceed its solubility in the solution, whereby reaction occurs forming anisole and sodium sulfate, as fast as anisole is formed steam-distilling it off, condensing the distillate, separating it into an anisole fraction and an aqueous fraction, withdrawing the anisole fraction as product, returning to the reaction vessel aqueous fraction as required to maintain the volume of reaction mixture substantially constant, and removing sodium sulfate as crystals from the reaction mixture.

7. In a process for producing anisole, the steps comprising continuously adding dimethylsulfate with violent agitation to the bottom of a volume of an aqueous solution containing about 23 per cent of sodium phenate by weight at about 106° C. under about one atmosphere absolute pressure in a reaction vessel, the rate of addition being such that the dimethylsulfate does not exceed its solubility in the solution, whereby reaction occurs forming anisole and sodium sulfate, as fast as anisole is formed steam-distilling it off, condensing the distillate, separating it into an anisole fraction and an aqueous fraction, withdrawing the anisole fraction as product, returning to the reaction vessel aqueous fraction from a point proximate to the anisole-aqueous interface as required to maintain the volume of reaction mixture substantially constant, and removing sodium sulfate as crystals from the reaction mixture.

8. In a process for producing anisole, the steps comprising continuously adding dimethylsulfate with violent agitation to the bottom of a volume of an aqueous solution containing about 23 per cent of sodium phenate by weight at about 106° C. under about one atmosphere absolute pressure in a reaction vessel, the rate of addition being such that the dimethylsulfate does not exceed its solubility in the solution, whereby reaction occurs forming anisole and sodium sulfate, as fast as anisole is formed steam-distilling it off, condensing the distillate, removing sodium sulfate as crystals from the reaction mixture, washing the crystals, dissolving them in the condensed distillate, separating the distillate into an anisole fraction and an aqueous sodium sulfate solution fraction, withdrawing the anisole fraction as product, and returning to the reaction vessel aqueous fraction from a point proximate to the anisole-aqueous interface as required to maintain the volume of reaction mixture substantially constant.

WALTER D. SMUTZ.

REFERENCES CITED

The following references are of record in the file of this patent:

UNITED STATES PATENTS

| Number | Name | Date |
|---|---|---|
| 1,564,214 | Derick et al. | Dec. 8, 1925 |
| 2,205,395 | Coleman | June 20, 1940 |

FOREIGN PATENTS

| Number | Country | Date |
|---|---|---|
| 214,783 | Germany | Oct. 14, 1909 |